Dec. 28, 1965     A. H. BURNER     3,225,453
PROCESS AND APPARATUS FOR DRYING ELASTOMERIC MATERIALS
Filed July 22, 1963     3 Sheets-Sheet 3

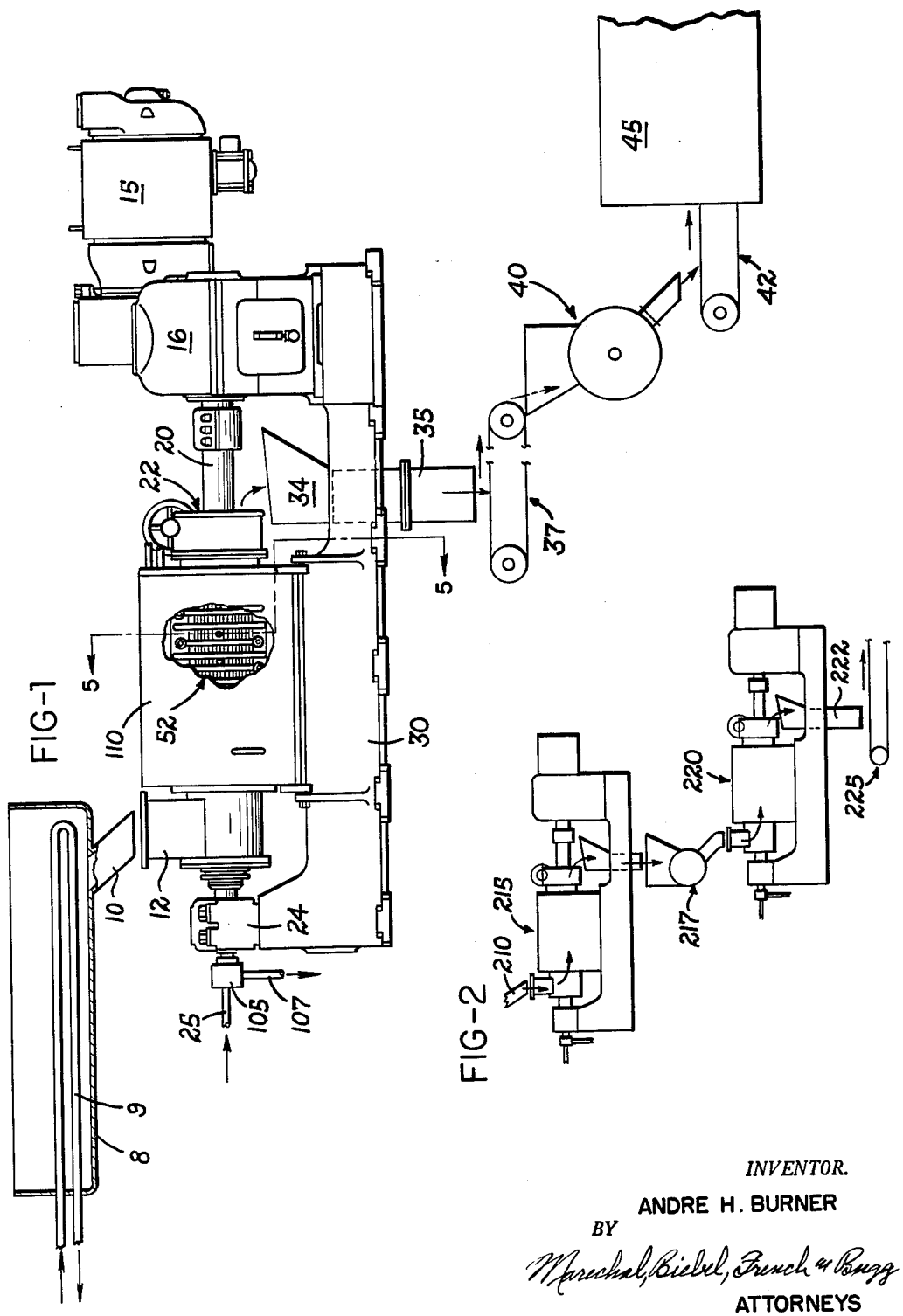

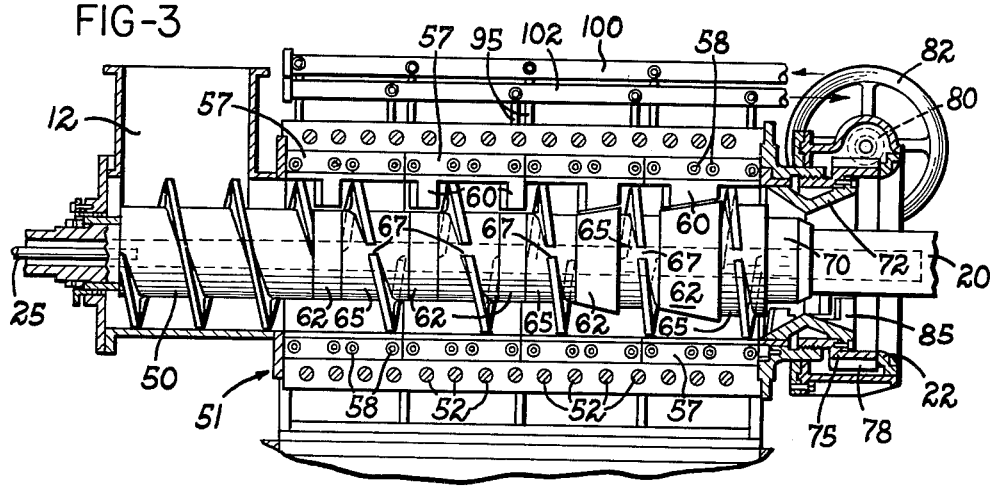
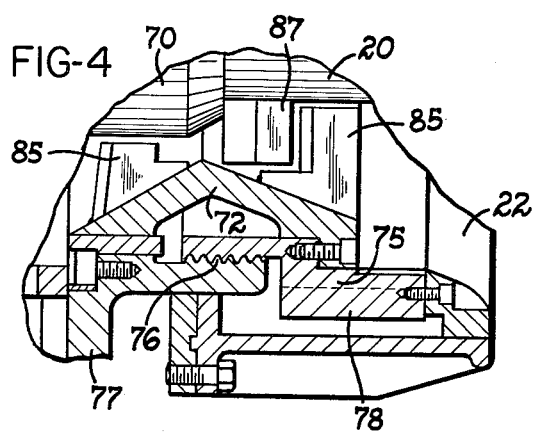
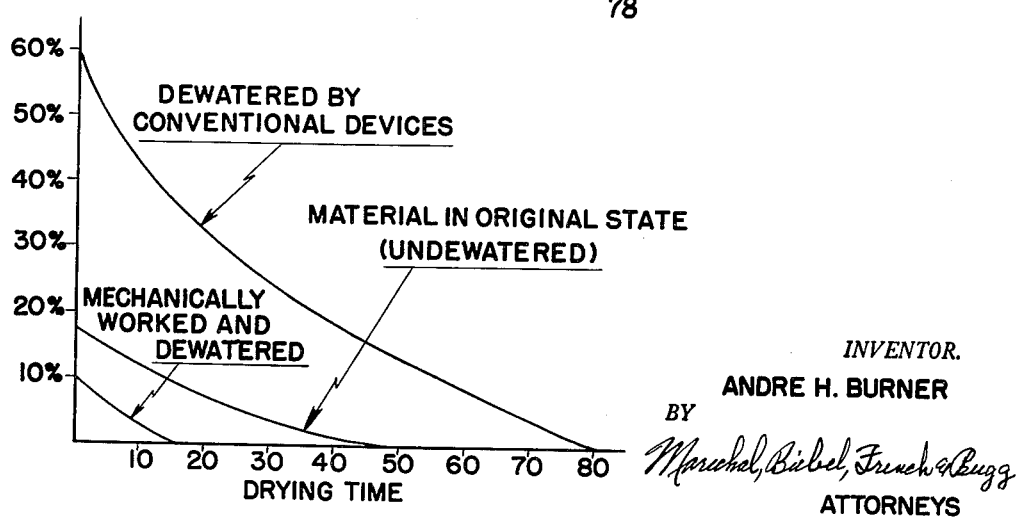
INVENTOR.
ANDRE H. BURNER

INVENTOR.
ANDRE H. BURNER
BY
*Monchal, Biebel, French & Bugg*
ATTORNEYS 3,225,453
Patented Dec. 28, 1965

3,225,453
PROCESS AND APPARATUS FOR DRYING
ELASTOMERIC MATERIALS
Andre H. Burner, Piqua, Ohio, assignor to The French
Oil Mill Machinery Company, Piqua, Ohio, a corporation of Ohio
Filed July 22, 1963, Ser. No. 296,843
9 Claims. (Cl. 34—12)

This application is a continuation-in-part of copending application Serial No. 92,909, filed March 2, 1961, and now abandoned.

This application relates to a process and to apparatus for performing such process, whereby natural rubber or synthetic rubber materials, or natural or synthetic elastomers of similar character may be dried thoroughly, such that the retained moisture of the end product is less than 1% by weight.

The invention relates to drying process and apparatus for both natural and synthetic rubbers, and for the drying of other natural and synthetic elastomeric materials which also may retain moisture which it is desired to remove. As specific examples of the utility of this invention, reference is made to the desirability to remove liquid from synthetic rubber materials for the purpose of obtaining an essentially dry crumb rubber product which can be compressed and baled for shipment and later use in manufacturing various articles. Similarly, it is desirable to remove liquid from natural rubber for the same purpose, so that an essentially dry natural rubber crumb product can be obtained for baling and shipment. With respect to the natural rubbers, this invention also is of particular significance in that great savings in processing time and labor may be realized.

In either event, however, the apparatus employed is of essentially the same character, and in most respects the process of drying is essentially the same. Hence, the invention provides a process and apparatus which are applicable to the drying of both natural and synthetic elastomeric materials.

Heretofore, in the manufacture of synthetic rubber, the material is prepared by coagulating the synthetic latex or the like, and during this process the crumb rubber which is formed takes on a large amount of liquid. It is desirable to remove this liquid so that the rubber will be shipped as a dry product. The free liquid is drained off as much as possible. The crumb is then dewatered to approximately 30 to 50 percent moisture whereupon it is fed into continuous apron type or tunnel type hot air dryers to remove the moisture to commercial dryness which is understood to be a fraction of one percent residual moisture. In the case of synthetic rubber, there is so much liquid to be removed, and the temperatures must be maintained below the point where the rubber would be damaged, that a long period of time is required for the drying operation and, therefore, very large tunnel dryers are necessary.

Heretofore, in the manufacture of natural rubber, the latex is generally coagulated into slabs called coagulum which contains a substantial quantity of liquid. This liquid is partially removed by squeezing the coagulum between mill rolls forming a blanket or sheet which is then hung up to air dry in sheds. Sometimes heated air is used, sometimes ambient air is used. In either case, the drying time takes from one week to four weeks, after which the rubber is cut into strips the size of the bale, stacked up, and formed into a bale for shipment.

As examples of the time required for effective drying according to presently used processes, an average drying time for synthetic rubber materials, for purposes of comparison with the present invention, may be assumed to be approximately sixty minutes, in order to produce the desired essentially fully dried product as mentioned previously. In the case of natural rubber, prolonged air drying takes from one to four weeks at present. The present invention reduces the time to obtain an essentially completely dried product to a matter of a few minutes. Thus, as a result of the present invention, significant economies are achieved, both by reducing the cost of the drying operation from the standpoint that mechanical drying, as provided hereby, is more efficient than air drying, from the standpoint of substantial savings in time, and also from the standpoint of simplification and reduction in cost of the apparatus necessary to perform the drying function. Also, by removing a greater amount of liquid through mechanical means, it is inherent that salts contained in solution in such liquid will be removed, whereas in air drying a greater proportion of such salts will remain in the end product, thereby reducing its purity.

In accordance with the present invention the prepared rubber or other elastomer is subjected to heat, below the temperature which will damage the crumb, but sufficient to vaporize, or substantially to vaporize, liquid which is contained in relatively tiny pockets within the rubber. The rubber is simultaneously worked mechanically, by apparatus which tears, kneads, and otherwise manipulates the heated rubber to rupture the pockets containing liquid, providing for escape of such liquid in either the vapor or liquid state, and such vapor and/or liquid is immediately separated from the material.

The mechanical working of the material is in many instances of sufficient magnitude to cause the required heating, although in some cases it may be feasible to heat the material first, adding sufficient heat to the material in the working step to aid in causing the liquid to be at least partially vaporized and thus ready to burst from the tiny pockets in the material as these pockets are ruptured during the working step.

The working step is carried out in a jacket or chamber which is of sufficient strength to maintain mechanical pressure on the heated material during the working, tearing and kneading thereof. This chamber is provided with drainage passages through which the freed liquid and/or vapor may flow readily so as to be removed from the material, and separated therefrom, with minimum amount of further contact between the solid and the liquid or vapor phase being removed.

An additional benefit of flashing off the liquid as a vapor during the mechanical working and heating process, is that latent heat of vaporization removed from the rubber thereby cooling the rubber to prevent damage from excessive temperatures.

The mechanically dried material is then conveyed out of the chamber, and, since it may tend to stick or coagulate in large balls or chunks, it is subjected to a tearing step as it is discharged from the chamber to reduce the size of the chunks, and to impart to the material a porous character such that if further air drying is necessary, the material will give up its remaining moisture readily. If the material is essential dry, then the porosity will facilitate quick cooling of the material to baling temperature. The chunks may then be passed if necessary to a hammermill or the like where they are broken into further small pieces which are baled and sold for use in further manufacture processes.

It is important to recognize certain distinctions between tearing, on the one hand, and cutting or extruding the crumb material. This distinction is of importance in connection with the process and apparatus where the crumb material is partially dried, and the terminal part of the drying should be accomplished in some type of thermal drying apparatus as previously mentioned. In the case of material which is completely dried in accordance with the process, this distinction is not important.

If the material is sliced (i.e., cut with a sharp edge) the tendency is to seal the exposed surface of the material, making it difficult to remove later by a heating process (e.g. a thermal or air dryer) to any internally contained liquid. If the material is extruded with some liquid still retained therein, the crumb material is compacted, again forming a sealed surface through which it is difficult to remove liquid by air drying. It should be kept in mind, however, that this distinction is not important when the material is completely dried according to the foregoing process. Thus, the essentially dry material can be extruded if desired.

It has been found expedient to use extrusion through a variable orifice pelleting die or the like when processing natural latex in accordance with the invention to obtain an essentially completely dried natural rubber product. In such an instance the rubber is extruded through the die in a semi-plastic state and at a relatively high temperature, for example in the neighborhood of 300° F. Any retained liquid is, of course, in the vapor state, or will flash to the vapor state as soon as the pieces of material pass through the die, and mechanical pressure is released. The material coming from the die has been observed to burst under the effect of any releasing vapor in such an instance, leaving a honey-comb effect in the resultant product.

As mentioned, if the material is run through the pressing apparatus and heated to a high enough temperature (with regard to the temperature limits within which the drying operation must be conducted) while simultaneously working the material and causing the released vapors and/or liquid to be conducted away, it is possible to dry the rubber to a condition where the dry rubber contains a fraction of 1% moisture. For practical purposes in the art this may be considered as bone dry. In such instances, it is of course unnecessary to accomplish any further drying of the rubber. The foregoing describes the basic or essential process of drying rubber in a screw press of the interrupted flight continuously operating type. The essential steps of accomplishing mechanical drying of the rubber have been set forth without regard to certain practical aspects of the process.

Particularly with regard to the synthetic rubbers, if the rate of feed of material through the press is increased, or the heat applied during (or immediately before) the pressing, tearing, kneading, etc., of the rubber is reduced, then the percentage of moisture remaining in the product issuing from the press may be higher, for example up to about 15% by weight. Nevertheless, the great majority of moisture has been removed from the rubber and the rubber is of such a porous nature that it can be passed, through a hammermill if desired, to a conventional hot air drying apparatus and dried to the desired essentially bone dry end product, within a much shorter time than formerly was required in the dryer, resulting in considerable saving in dryer capacity, as by running the dryer at a lower temperature, or increasing the rate at which the crumb is passed through the air dryer, or by reducing the required drying capacity of the air dryer. It is significant that the dewatered rubber *can* be dried further if this is necessary, and at a high drying rate.

Another arrangement contemplated by this invention involves the use of two pressing devices of the type disclosed herein, connected in series. In some instances it may be desirable to have apparatus connected between these two devices to receive the dewatered or "lower moisture content" material from the first press and to reduce the size and to tear apart the material issuing from the first press, and then to follow up with a second pressing operation on the material involving heating and simultaneously tearing, kneading, and otherwise mixing the material. Whichever of the foregoing arrangements may be employed depends to varying extent upon factors to be considered in the particular drying operation involved. For example, the capacity of the operation must be considered; the requirements may be to supplement rather than replace existing drying equipment; drying times and amount of moisture to be removed by the press may vary with different types of elastomeric material being dried; and the type of power available, and its cost, may have some bearing upon the specific arrangement to be used. It is also possible to maintain a better control of the process by using two presses in series, since the pressure midway in the dewatering and drying process can be controlled independently of the final pressure. In any event, by performing a substantial proportion of the drying operation in a mechanical fashion, which is inherently more economical than thermal drying (i.e., by hot air), it is possible to obtain significant economies in the drying of the different types of rubber previously mentioned.

One feature of this invention is the fact that a favorable drying rate can be attained for the final air drying step (e.g., drying mechanically dewatered synthetic rubber by a hot air dryer). This favorable drying rate is, at least in part, due to the porous nature of the dewatered crumb elastomer product which results from the novel dewatering process according to the invention. For example, by mechanically working the wet material and simultaneously conveying away or separating the moisture from the solids of the material during such working step, a porous dewatered rubber product is obtained which, due to its porous nature, gives up such moisture as may be retained therein at a much faster rate than similar wet rubber which has been merely compressed to squeeze most of the water out of it. With such a process it is possible to obtain a porous dewatered rubber crumb having a moisture content in the neighborhood of 10 to 15% by weight.

If the mechanical working and pressing process, with removed moisture being carried away immediately, is performed on heated wet rubber, a more favorable or lower residual moisture content can be obtained. For example, it is possible to add the heat during the working step (beyond the heating resultant from friction) and reduce the moisture content of the resultant dewatered crumb to in the neighborhood of 5% by weight, without in any way adversely affecting the drying rate of such end product in subsequent thermal drying steps. As mentioned previously, when the rubber is merely pressed, particularly without the simultaneous mechanical working thereof, the moisture is sealed in, and the drying rate of such a dewatered crumb product is significantly lower, in other words, considerably more time is required to remove this "sealed in" moisture by a thermal process.

Accordingly, the primary object of this invention is to provide a new process by which natural or synthetic elastomeric materials and the like can be dried in a more economical and more rapid manner than has heretofore been possible.

Another object of this invention is to provide a process for drying rubber materials wherein such rubber is heated to a temperature at which encapsulated liquid in the wet material is vaporized, or substantially fully vaporized, and the heated rubber is torn, kneaded, mixed, and otherwise mechanically worked to expose or destroy the pockets within which liquid is encapsulated, thereby permitting the vaporized or partially vaporized liquids to escape, resulting in substantial dewatering of the rubber without adversely affecting the thermal drying rate of the dewatered crumb product.

A further object of the invention is to provide such a process wherein the heating and the working steps are performed essentially simultaneously upon the crumb rubber, and wherein provision is made for immediate escape, and therefore separation, of the vapor and/or liquid so released, from the solids of the rubber being worked, thereby minimizing the tendency of the rubber to retain the released liquids, and reducing the necessary temperatures.

Another object of this invention is to provide such a process wherein natural or synthetic elastomers are essentially completely dried by a mechanical process, eliminating the need for air drying thereof, and producing a porous product which is readily cooled to baling temperature.

A further object of the invention is to provide a process for drying rubber or other elastomers wherein the rubber is dried by an essentially mechanical operation to a desired low moisture content, and the resulting almost dry rubber is still capable of air drying, such as by exposure to hot gases or hot air, to an essentially bone dry condition at a favorable drying rate, such as approximately equivalent to the drying rate of a crumb rubber product which has not been dewatered mechanically.

A further object of this invention is to provide a novel mechanical drying process for rubber wherein the wet rubber is heated and mechanically worked under relatively high mechanical pressure to remove a substantial portion of its moisture content, and the dewatered rubber is then subjected to a shredding or tearing operation, after which it is again mechanically worked and heated to such an extent that its total moisture content is reduced to a fraction of 1% total moisture by weight.

Another important object of this invention is to provide a novel apparatus for working and drying materials such as rubber, including constructions to prevent clogging of the apparatus and provisions for ease of maintenance to facilitate the cleaning and replacement of those parts which may tend to clog under some conditions.

Additional objects and advantages of the invention will be apparent from the following description, the accompanying drawings and the appended claims.

In the drawings:

FIG. 1 is a side elevational view of the over-all arrangement of an expressing and drying apparatus as used to perform the novel process disclosed herein, with a fragment of the casing broken out to show the general exterior of the cage structure;

FIG. 2 is a similar view of a modified form of apparatus for performing the drying process;

FIG. 3 is a sectional view, on an enlarged scale, showing the essential features of the interior construction of the expression cage and associated parts;

FIG. 4 is an enlarged detailed view of a portion of FIG. 3, showing the details of breaker lug constructions which tear apart the relatively large masses of compressed and dried material issuing from the apparatus;

FIG. 6 is a graph illustrating the comparative drying times of the present process, and the conventional thermal or hot gas drying process.

Figure 5:
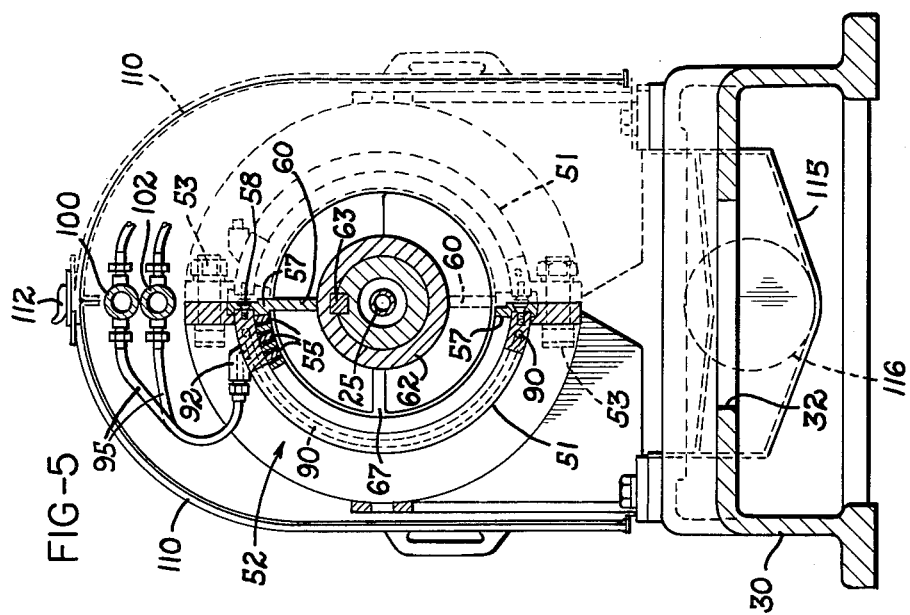
FIG. 5 is an enlarged cross-sectional view, taken essentially through the center of the expression cage, showing the manner in which one-half of the cage may be opened, and showing in dotted lines intermediate positions of certain parts of the apparatus.

Referring to the drawings, and particularly to FIG. 1, it will be understood that the drying process of the present invention is applicable to many different types of rubber materials. As examples of such material, which have been successfully dried in accordance with the invention, reference is made to the butadiene-acrylonitrile elastomers. In the manufacture of such synthetic rubbers, which is accomplished by emulsion polymerization of butadiene and other materials, for example styrene in the case of manufacturing synthetic rubber known as GR–S rubbers, the synthetic liquid latex is coagulated and washed in water, and then must be dried before it can be baled and used. It is generally acceptable in the art that the crumb rubber, as it is called, is dried when its liquid content has been reduced to a fraction of 1% liquid by weight.

Following the polymerization and washing process, the synthetic rubber is in the form of wet, relatively small chunks, in the nature of a curd. This mass of wet crumb rubber is passed over a vibrating screen, or through some equivalent apparatus, where the surface liquid is drained off, and the wet crumb rubber is then subjected to the drying process. In the past, this has been accomplished by passing the material through a vacuum drum filter, which apparatus may be capable of reducing the liquid content of the rubber crumb to around 30%, after which this still relatively wet crumb rubber is passed to a so-called tunned drier in which hot air is circulated to remove the rest of the liquid. In a similar process previously used, squeeze rolls have been employed, instead of the vacuum drum filter, and again the moisture content is reduced only to about 30% after which the relatively wet synthetic crumb rubber is passed to the drier. Also, the wet crumb rubber has ben extruded in pellet form, having substantially less than 30% moisture, but these pellets, due to lack of porosity, give up their retained moisture only with considerable difficulty in a tunnel dryer.

The foregoing refers to synthetic rubber materials and drying thereof. The invention also applies to the drying of natural latex or natural rubber which is prepared as a crumb material and dried. In many respects the natural rubber is similar to and can be handled in the same manner as the synthetic rubber, but there are certain differences as will be more fully explained hereafter. The same process applies to the dewatering and drying of other synthetic or natural elastomers.

For purposes of explaining the process according to the present invention, it will be assumed that the wet synthetic rubber crumb, as it would be supplied to such vacuum filter or squeeze rolls, is introduced into a tank 8, having a heater coil 9, and then discharges to the chute 10, FIG. 1, and passes into the feed hopper or chamber 12 of a novel mechanical drying apparatus, in the general form of an interrupted-flight high pressure screw press. This apparatus is driven by a motor, such as electric motor 15, which is coupled through a gear reduction unit 16, to the main shaft 20 of the screw press. This shaft, as shown particularly in FIG. 3, extends from the discharge ring 22 through the entire press unit, including the bottom of the inlet hopper or chamber 12, and passes therefrom through a support bearing 24. The shaft is hollow, at least through that portion of its length which is within the press structure, and a tube 25 extends through the hollow shaft, opening interiorly thereof adjacent the discharge end, and adapted to supply a heating fluid (for example, steam) to the interior of the shaft.

The entire press unit is mounted upon a base 30 (FIG. 1), including also the gear reduction unit 16 and the drive motor. This base is provided with a central opening 32, seen particularly in FIG. 5, and a receiving hopper 34 and a discharge chute 35 serve to conduct the dried, crumb rubber into small pieces, and it will be unsuch is necessary, whereby the dried crumb rubber is carried to a conventional apparatus for tearing or shredding, shown by way of example as hammermill unit 40. This unit serves to grind or tear the dried, or substantially dried, crumb rubber into smill pieces, and it will be understood that in many circumstances it is not needed. The hammermill in turn discharges onto the conveyor 42 of a conventional tunnel dryer unit 45, in which hot air is passed over the porous crumb rubber to reduce the moisture content thereof to the aforementioned acceptable essentially bone dry condition. In some instances, depending upon the material being dried, it may not be necessary to pass the material through the hammermill 40, and accordingly it can then be omitted.

Furthermore, depending upon practical considerations such as the throughput capacity of the press, the temperature limits within the rubber can be dried, and other economical considerations such as power consumed, it may be possible to dry the crumb rubber down to a fraction of 1% moisture content or less solely through use of the novel expressing apparatus disclosed herein. In such instances, the hammermill 40 may or may not be required to reduce the size of the dry crumb rubber product, but the thermal drying unit 45 can be omitted completely, and the crumb rubber product can be baled or otherwise packaged immediately, without the need for further drying.

FIGS. 3, 4 and 5 show details of the novel expressing apparatus by means of which the present process is performed. The shaft 20 carries a feed worm 50 which takes up and compacts the wet crumb rubber supplied into the feed chamber 12. The compacted material is carried by feed worm 50 into the main expression chamber, which is in the form of a split cage unit 52 having a plurality of relatively large drainage openings in the sides thereof. This cage unit is suitably supported on the base 30.

When the cage is assembled, the cage sections 51 are securely fastened together by bolt and nut fasteners 53, two of which are shown in dotted lines in FIG. 5. The cage is shown disassembled in full lines in this figure, with the removed half shown in dotted lines. Further of the bolts 53 are shown in section in FIG. 3. The interiors of the cage sections are lined with screen bars 55 (FIG. 5) which preferably extend longitudinally of the cage, and which are spaced slightly apart by suitable spacer members (not shown) forming drainage openings between adjacent screen bars. These drainage openings, it will be understood, extend substantially the full length of the cage, and each opening is of relatively small cross-section with respect to the large drainage openings formed in the cage sections. Therefore, the drainage openings will permit the passage of liquids or vapors from the cage, but solids being compressed and worked within the cage will be contained therein.

Each cage section is provided with a center bar 57 at its top and bottom, and these center bars serve to retain the screen bars in the sections, being in turn bolted to the sections by a plurality of retainer bolts 58. Certain of the center bars are provided with inward extending lugs 60, preferably having a beveled edge facing the inlet end of the cage. These lugs 60, generally referred to as breaker lugs, serve to engage the material being forced toward them by the worm flights, and to prevent rotation of the material along the extent of their length axially of the cage, causing the material to be fed toward the discharge end. Thus, in the areas within the cage corresponding to the breaker lugs 60, shaft 20 is surrounded by collars 62. Some of these collars may be of uniform cross-section along their length while others may be formed to increase in cross-section toward the discharge end of the cage, thus forming with the cage walls a passage of decreasing corss-section through which the material is forced, resulting in mechanical compaction and compression of the material.

The compacting forces are increased and directed radially by these collars. This substantial radial pressure has the effect of forcing the liquid through the drainage openings, even though such openings may be filled with the solids. This obviates the tendency of the drainage openings to plug up to such an extent that the liquids cannot be separated from the solids in the cage. Otherwise, it is necessary to stop the press, open it, and clean out the drainage openings.

Between the collars 62, surrounding the shaft and driven therefrom through a key 63 (FIG. 5) or the like are worm members 65 which take up the material passing from the preceding collar, and force the material over the following collar. These worm members preferably, although not necessarily, are provided with notches 67 in the worm flights. This notched worm construction serves to enhance the mechanical working of the material as it passes through the cage.

The material forced toward the discharge end by the last worm 65 is passed over the discharge sleeve 70 which cooperates with the discharge cone 72 to form a discharge orifice of substantially less cross-sectional area than the orifice at the inlet. Thus, the material is forced and compressed, as it passes through the expression cage, toward such discharge opening, and the back pressure upon the material may be controlled by varying the size of the discharge opening. This is accomplished in a conventional manner by mounting the discharge cone 72 upon a control ring 75 which is threaded at 76 to a stationary ring 77 on the end of the cage. Ring 75 is formed with gear teeth 78, constituting a pinion which remains in mesh with worm 80 through its range of movement parallel to shaft 20. The worm is controlled by a hand wheel 82 which provides a means for varying the position of discharge cone 72, and thus controlling the cross-sectional area of the discharge opening. The discharge ring 22 is in turn mounted on the ring 75, as shown in greater detail in FIG. 4.

Since the material issuing from the chamber may be in rather large chunks, the discharge cone 72 is formed with spaced apart inwardly extending lugs 85, and at least one rotating lug 87 is fastened to shaft 20 beyond the discharge collar or sleeve 70, and cooperates with the stationary lugs 85 to tear the material passing from the apparatus, thus providing for a smaller size of the dried product delivered by the apparatus, in a porous form. FIG. 4 shows that the stationary lugs 85 are spaced sufficiently apart along the length of the shaft to provide for movement in such direction of these lugs when the discharge cone is adjusted, thereby avoiding interference of these lugs with the rotating lug 87.

The cage sections are provided with internal passages 90 (FIG. 5), terminating in fittings 92 to which may be coupled flexible hose sections 95, as shown particularly in FIG. 5. These flexible hoses are connected to an inlet manifold 100 through which a heating fluid such as steam may be introduced, and an exhaust manifold 102 through which the heating fluid may be directly discharged away from the apparatus. Preferably, each cage section has a plurality of inlet and outlet fittings, and a corrsponding connection through a hose 95 to each of the supply and exhaust manifolds, thus promoting good heat transfer throughout the length of the treating cage, and to facilitate maintenance of the apparatus.

Similarly, the worms and collars are heated (through shaft 20) by steam supplied through pipe 25, and this steam is exhausted around this pipe and conducted away through a conventional rotary seal into a surrounding chamber 105, and thence into an exhaust pipe 107 (FIG. 1). The cage itself is covered by outer enclosure 110 of two complementary pieces which are joined at the top by a conventional latch 112. Beneath the cage there is a collection pan 115 for the expressed liquids, and this pan opens into a suitable discharge 116 through which liquids and/or vapors may escape once they have been separated from the material and passed through the drainage openings of the cage to its exterior.

If for any reason the drainage openings between the screen bars should become fouled or clogged, or if the parts of the apparatus within the cage should require maintenance for any other reason, it is possible to gain access to the interior of the cage with relative ease by removing the bolts 53 and opening the split cage. Of course, in such operation the steam supply and exhaust lines may be uncoupled if necessary. This arrangement permits ease of maintenance of the apparatus, so that the apparatus can be kept in operation as continuously as possible.

In operation of the apparatus, the wet rubber crumb is applied to the feed hopper or chamber 12, and the feed worm 50 picks up this wet crumb and advances it into the main drying and extraction chamber, wherein the crumb is subjected to high mechanical pressure while it is simultaneously worked by the action of the notched worms 65 and the breaker bars or lugs 60, thus mechanically working, kneading, and tearing the compacted material while it is simultaneously heated, through transfer of the heat from the steam to the cage and the screen bars 55, and through heat transfer from the worms and collars which in turn are heated through the shaft 20 by the steam supplied through pipe 25.

Accordingly, by using steam at a pressure above atmospheric, the material in the chamber can be heated to in excess of 212° F., but the temperature is maintained below the temperature at which the particular type of rubber is damaged. Of course, this maximum temperature may vary with different types of rubber materials being processed. The moisture encapsulated or contained within pockets of the crumb rubber is therefore heated to a temperature where all (or substantially all) of the moisture is vaporized, and this apparently builds up an internal pressure in such moisture pockets which promotes the rupture thereof when the pockets are torn by the mechanical working of the material. The vapor thus released, and moisture if any of such is present, is readily removed immediately from the solid material by reason of the venting or drainage passages between the screen bars.

Furthermore, by reason of the mechanical working of the material, it is expelled from the apparatus in a porous condition, and experience has shown that if the moisture content of the material is reduced to less than 10 or even 5%, as may be the case in some instances, it is possible still to remove the remaining moisture (down to within a fraction of 1% moisture content) in a thermal dryer, at a favorable drying rate. This is in contrast to known extraction processes, wherein this final moisture content is sealed into the rubber in such a way that the thermal drying thereof is very difficult, and the drying rate is substantially lower.

Referring to the chart in FIG. 6, this chart is a plot of the drying times required for the crumb rubber prepared in different ways, against the presence of moisture in the material. The slope of each curve, therefore, represents the drying rate for the particular material. Thus, if the wet rubber is dewatered in an extruder or pelletizer, or by some equivalent process, the drying time for this material is shown by the curve labeled "material in original state." By working the material mechanically while dewatering it, in accordance with the invention, and then completing the drying down to 0% moisture in the thermal dryer, a drying rate during the final thermal drying is obtained which is at least as favorable as the original drying rate, and perhaps somewhat greater. On the other hand, if the material is dewatered by conventional pressing devices, such as an extruding press, in which there is no substantial working of the material and in which the water is not immediately drained away when separated from the solids, then a considerably lower drying rate results and the material so dewatered will require considerably more time in the thermal dryer to complete the drying thereof.

FIG. 2 shows a modified drying arrangement in which essential all moisture may be removed from rubber by mechanical drying apparatus in accordance with the invention. The form of apparatus shown in FIG. 2 is particularly adaptable for the drying of both synthetic rubber, natural rubber, and other elastomers. The apparatus as shown is adapted for drying synthetic crumb rubber, and the synthetic crumb is supplied from the chute 210 in much the same manner as from the chute 10 in FIG. 1.

With natural rubber materials the wet natural rubber may be available as slabs or sheets, sometimes referred to as coagulum, which are in essence coagulated natural latex. The invention also encompasses the drying of so-called scrap rubber, which is the natural latex scraped from the trees or from the ground where it may have fallen in the plantation or collected in latex collecting cups. In either event, the natural rubber is run through a hammermill or some equivalent shredding apparatus, for example as shown at 40 in FIG. 1, to reduce the size of the particle to feed to the appratus, and this material is then supplied through the chute 210.

In either event, the wet rubber passing through chute 210 goes to a first working and heating apparatus 215 which is of the same type as disclosed in FIGS. 1–4. In this appratus, for example, liquid may be removed down to approximately 15% retained liquid. The relatively dry rubber crumb then passes through a shredder to reduce the size of the chunks suitable to feed to the next apparatus, which may be incorporated in the discharge of the apparatus 215, or may be a separate device such as the hammermill 217 if desired. From the shredder the dewatered material is passed to a further working and heating apparatus 220 of the same general character as shown in FIGS. 1–4. This apparatus will work the rubber, and heat it due to friction (or heat can be added externally if needed) and the material will thus be freed of liquid which will tend to flash off as vapor, and which can escape immediately through the drainage openings of the apparatus to separate it from the material and also to produce the aforementioned cooling effect.

In this apparatus, since the resultant product is an essentially dry crumb rubber, the previous comments herein regarding slicing or extruding of the material do not apply. No further air drying step is necessary. In this regard, when processing natural rubbers it has been found desirable to employ a variable orifice pelletizing die or the like at the discharge of the apparatus 220. Such a mechanism can be adjusted to contol the back pressure, and hence the pressure exerted on the material. Since the natural rubber discharges from the die as a sticky and semi-plastic mass, it is impossible to tear or shred the material at this point. The adjustable die reduces the particle size to permit flashing of any retained vapor and also produces a particle which will cool rapidly.

In fact, in working with natural rubbers it has been noticed that the material discharging through such a die will have a honey-comb effect resulting from a very slight amount of retained vapor flashing off and bursting from the material at the discharge.

The dry rubber is discharged through chute 222 onto a conveyor 225 or other suitable apparatus for carrying the dry crumb away to be baled or otherwise used. Preferably, the conveyor is of sufficient length that the dry rubber will cool satisfactorily prior to baling.

While the forms of the method and apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. Apparatus for mechanically dewatering rubber material while maintaining the drying rate of the dewatered material within predetermined limits, comprising wall means defining an elongated cylindrical expression chamber having an inlet at one end and an outlet at the other end thereof and a plurality of drainage openings through the walls thereof over the full length of said chamber and distributed around the entire periphery of the chamber to surround the rubber material with drainage openings through which fluids removed from the rubber material are immediately conducted away from such material, a shaft extending through said chamber having a plurality of working and conveying worms mounted at spaced locations therealong, said worms including a worm body having a substantially smaller diameter than the interior of said chamber and having worm flights extending from said worm bodies to adjacent said wall means defining said chamber, collar members mounted on said shaft between said worm members, at least some of said collar members tapering outwardly from the preceding worm body to a greater diameter than said preceding worm body, breaker lugs extending from said wall means toward said collar members, drive means connected to rotate said shaft for conveying rubber material through said chamber, said worms and said collar members and said lugs cooperating to work the rubber material for rupturing pockets therein to release fluids encapsulated in such pockets while simultaneously exerting mechanical pressure on the material, and means adjacent said chamber outlet operated by said shaft and effective to tear the dewatered rubber material passed therefrom to reduce the particle size of the dewatered rubber material without compacting thereof and without sealing the surface of the particles of rubber material.

2. Apparatus as defined in claim 1, including means for heating said chamber to a predetermined temperature providing for controlled heating of the material during working thereof to promote the rupture of liquid containing pockets in the material.

3. Apparatus for mechanically dewatering rubber material as defined in claim 1, wherein said tearing means at said chamber outlet includes at least one stationary lug and one other lug mounted for rotation by said shaft to pass said stationary lug in predetermined spaced relation such as to tear the dewatered material issuing from the outlet and passing through the space between said lugs without shearing the material.

4. Apparatus as defined in claim 3, wherein said tearing lugs are formed with blunt edges for engaging the material to avoid shearing of the material.

5. Apparatus as defined in claim 1, wherein a second expression chamber is mounted to receive the material from said tearing means, said second chamber also having drainage openings throughout its walls, and further working means operative in said second chamber to work the material for releasing any residual moisture therefrom to obtain an essentially dry material issuing from said second chamber.

6. Apparatus as defined in claim 1 wherein at least some of said worm flights comprise spaced worm flight segments defining notch-like spaces therebetween for working of the material as it is advanced by said flight segments toward said chamber outlet.

7. The continuous process of drying wet rubber-like material having small pockets containing liquid to be removed in order to produce a dry product, comprising
(a) conveying the wet material through an elongated expression chamber,
(b) releasing fluid from the material throughout the extent of the expression chamber through small drainage openings in the walls thereof over the full length of the chamber and distributed around the entire periphery of the chamber whereby the fluids are immediately released from the material and tend to pass directly to the outside of the chamber and to be separated from the material,
(c) simultaneously compressing and mechanically working the material during passage thereof through said expression chamber to cause heating of the material above the vaporization temperature of liquids contained in the material,
(d) tearing and mixing the material as a part of said mechanical working to rupture the liquid containing pockets and to permit the liquids to escape in liquid and/or vapor form producing a cooling effect on the material in said chamber by reason of the transfer of heat of vaporization from the material to liquid being vaporized,
(e) continuing steps (b), (c) and (d) until essentially all the liquid content of said material is removed as liquid or flashed off and removed as vapor, and
(f) breaking the material into small porous pieces as it discharges from said chamber to obtain a porous crumb-like product which is essentially free from liquid.

8. The process of claim 7 wherein in step (c) the material is subjected to alternate steps of compression and relaxation of mechanical pressure while being mechanically worked to promote vaporization of liquid during the mechanical working.

9. In the continuous process of drying wet rubber-like material having pockets of liquid to be removed in order to produce a dry product, the steps comprising
(a) continuously conveying the wet material through an elongated expression chamber,
(b) simultaneously subjecting the material to fluctuating compression forces and to mechanical working by passing the material over collar members within said chamber and through screw flights intermediate the collar members with at least some of the collar members tapering outwardly from the worm body of the preceding screw flight to a greater diameter than said preceding worm body, whereby the material is raised in temperature above the vaporization temperature of contained liquids without reaching a temperature at which the material will be damaged.
(c) tearing and mixing the material as a part of said mechanical working to rupture the liquid-containing pockets and to permit the liquids to escape in liquid and/or vapor form producing a cooling effect on the material from transfer of heat of vaporization from the material to liquid being vaporized.
(d) relasing the escaping liquid and/or vapor from the material throughout the extent of the expressing chamber through small drainage openings in the walls thereof over essentially the entire length and distributed around the entire periphery of the chamber whereby the fluids are immediately released from the material and tend to pass directly to the outside of the chamber and be separated from the material, and
(e) breaking the material into small porous pieces as it discharges from said expression chamber to obtain a porous like product in which the liquid content is substantially reduced.

References Cited by the Examiner
UNITED STATES PATENTS

| | | | |
|---|---|---|---|
| 1,539,340 | 5/1925 | Sizer | 100—117 |
| 1,871,833 | 8/1932 | Anderson | 100—149 X |
| 2,320,765 | 6/1943 | Upton | 100—93 |
| 2,346,500 | 4/1944 | Moore | 34—14 X |
| 2,763,896 | 9/1956 | Vogt | 18—48 |
| 3,023,455 | 3/1962 | Geier | 18—12 |
| 3,046,609 | 7/1962 | Bergmeister et al. | 34—14 |
| 3,067,462 | 12/1962 | Kullgren | 34—14 |

WILLIAM F. O'DEA, *Acting Primary Examiner.*
NORMAN YUDKOFF, *Examiner.*